Nov. 4, 1958     G. E. HANSEN ET AL     2,859,031
CALIBRATED SPRING ADJUSTING MECHANISM FOR RELIEF VALVES
Filed July 13, 1955
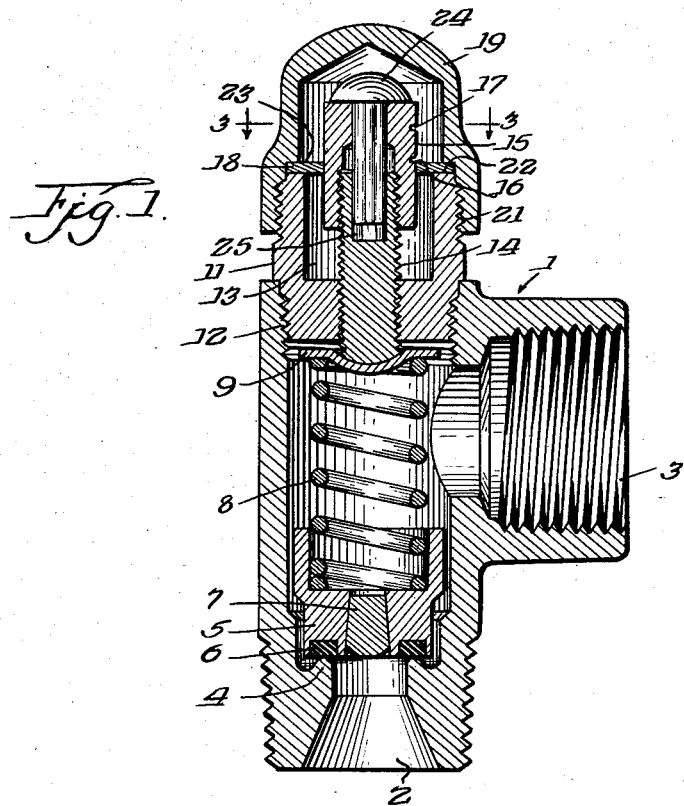
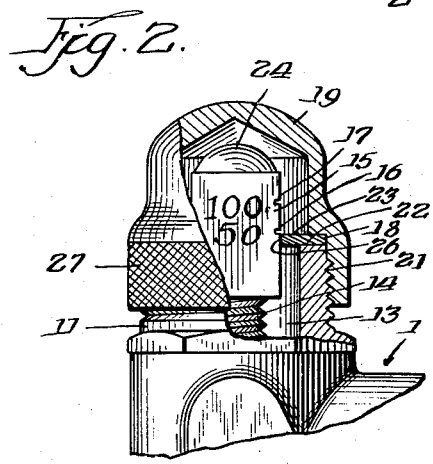
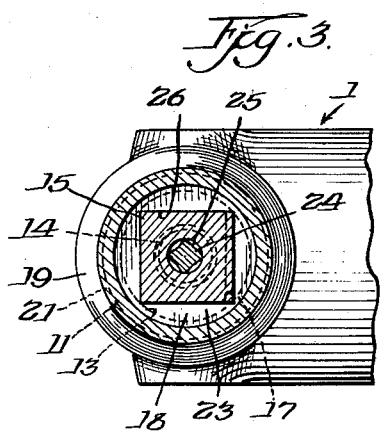
Inventors.
George E. Hansen, &
Edward W. Carr.
By Joseph O. Lange
Atty.

United States Patent Office 2,859,031
Patented Nov. 4, 1958

2,859,031

CALIBRATED SPRING ADJUSTING MECHANISM FOR RELIEF VALVES

George E. Hansen, Elmwood Park, and Edward W. Carr, Cicero, Ill., assignors to Crane Co., Chicago, Ill., a corporation of Illinois Application July 13, 1955, Serial No. 521,737

5 Claims. (Cl. 267—1)

This invention relates to a calibrated relief valve, and, more particularly, is concerned with means for effectively adjusting, setting and locking the relief valve to discharge at predetermined fluid pressures.

One of the more important purposes for which valves embodying this invention are used is in connection with water heaters, hot water boilers, and other forms of heat exchangers in the field, whereby it becomes necessary to have such flexibility in the valve design to permit ready changeability or adjustment of pressure setting in the field, while at the same time discouraging or avoiding the opportunity for tampering.

An important object of this invention is to provide for a structure in which a cheap and simple form of washer serves two purposes; namely, as a handwheel for adjusting the pressure setting and also as a locking device to eliminate the possibility of line vibration or the like from adversely affecting the desired pressure setting of the valve.

Another object is to provide for a structure in which a visible and accurate means of providing for the pressure setting is predetermined when the initial installation setting is being made and at the same time providing a combined lockup and enclosing structure lacking the usual invitation to said tampering.

Other objects and advantages will become more readily apparent upon proceeding with the drawings in which a fusible plug type of temperature and pressure relief valve is shown.

Fig. 1 is a sectional assembly view of the valve embodying our invention.

Fig. 2 is a fragmentary sectional view showing the details of a preferred locking and calibrating mechanism employed.

Fig. 3 is a sectional view taken on the line 3—3 of Fig. 1.

Similar reference numerals refer to similar parts throughout the several views.

Referring to Fig. 1, a fusible plug type of temperature and pressure relief valve is shown of the class set forth in our co-pending patent application Serial No. 490,985, filed February 28, 1955. A valve casing generally designated 1 is provided with a valve body or casing with the usual inlet 2 and a discharge or outlet 3 threaded as indicated for suitable pipeline connections (not shown). The casing 1 is provided with the usual annular seat 4 to receive in predetermined fluid sealing relation the closure member 5 having the seat facing 6 for contact with the seat 4.

At a central portion of the closure member 5, as illustrated, a fusible plug 7 is positioned which generally consists of pure Banca tin melting at relatively low temperatures so that in the event of excessive temperatures being encountered the tin will melt and thereby release the contained pressures through the discharge outlet 3 thereby to protect such boiler, heater or other container under adverse pressure conditions suddenly encountered. The valve closure member 5 is normally maintained under compression against its seat 4 by means of the coil spring 8, at the upper portion of which a dished spring washer 9 is provided, and which is held in place by means of the centerpiece 11 threadedly held as at 12 to the casing 1.

Within a chamber of the cap, as at 13, a headless set screw preferably of the type known as the Allen-head screw 14 is positioned receiving at an upper threaded portion thereof the square indicator member 15 which may be other than polygonal form and which preferably on its exterior is provided with spaced apart numerals, such as indicated at 50 and 100 with the corresponding notches 16 and 17 respectively. As shown, it is movable by means of the threads on the Allen-head screw to permit positioning the set screw in such placing, as desired. A washer 18 similarly of polygonal form fits snugly over the member 15 in non-rotatable relation therewith, as shown more clearly in Fig. 3.

A threaded cap 19 is threadedly applied to the member 11 by means of the threads 21 in normal assembly and locks the washer 18 against rotation by clamping the latter member tightly against the surface 22 of the centerpiece 11. Thus, it will be clear that upon rotation of the member 15 and the set screw 14 together with the washer 18, the coil spring 8 may be suitably compressed to provide the desired compression load on the closure member 5 to hold the latter against predetermined fluid pressures within the said casing.

At the same time, it will be understood that in rotating the adjusting member 15 because of the calibrations thereon as at 16 and 17, it will be easy and relatively convenient to establish the desired fluid pressure for the valve relief discharge by simply rotating the member 15 until the niche denoting the respective fluid pressures coincides with the upper surface 23 of the washer 18 as shown in Fig. 2. After the assembly and setting has been completed and before the locking cap 19 has been put in place, a filler stud 24 is applied to the square member 15 by being driven into frictional non-rotatable engagement with the upper central apertured portion as shown and thence into the splined socket 25 of the Allen set screw to prevent the ingress of sediment and foreign matter and also serve as a locking medium against relative rotation between the members 15 and 14.

When the latter assembly and setting has been completed, it will be appreciated that the three parts, such as the stud 24, the indicator member 15 and the set screw 14 constitute a locked unit.

Thus, it will be clear that by simply making the adjustment with the cap 19 removed as above described a convenient setting of the valve is accomplished and upon repositioning of the cap 19, the washer 18 together with the adjusting head 15 are locked against further actual rotation. Thus, it will be clear that the washer 18 assists in permitting easy manipulation for adjusting the pressure setting, thus serving as a locking device because of its polygonal gripping of the member 15 as shown more clearly at 26 in Fig. 3, eliminating the possibility of vibration from disturbing the pressure setting. The knurling 27 on the cap 19 aids in conveniently gripping the latter member to effect its rotation. It will be also apparent that the initial fluid pressure setting to correspond on the markings of the square or other polygonal form of the member 15 is accomplished by simply rotating the Allen-head set screw until the valve leaks past the seat 4. The drive stud 24 will then be inserted frictionally into the indicator square or block-like member 15 and thence into the hexagon forming the recess of the Allen-head screw 14 to complete the valve setting assembly.

Thus, it will be clear that a relatively simple, compact and easily adjustable relief valve mechanism has been provided.

It should of course be understood that while only a single embodiment has been shown, the invention is capable of taking form in many other configurations, and therefore it is the desire that the scope of the invention be measured by the appended claims.

We claim:

1. The combination of a spring for use with a relief valve and an adjuster mechanism for said spring comprising a recessed centerpiece for retaining the spring in position, a screw threadedly received in the centerpiece and bearing against the spring, the said screw having on an upper portion thereof an indicating block-like member threadedly attached to the screw and received within the centerpiece recess, a washer fitted snugly over the said block-like member in axially slidable non-rotatable relation thereto, the said screw having an axially extending socket therewithin, a filler stud frictionally engaging a central aperture of said block-like member and having an end projecting shank portion axially slidably and non-rotatably received in the screw socket, the said filler stud having an enlarged upper portion overlying the said aperture of the block-like member, and cap means engaging said centerpiece and said washer and clamping the said washer and said indicating block member in non-rotatable relation to the centerpiece.

2. The combination of a spring for use with a relief valve and an adjuster mechanism for said spring comprising a centerpiece for retaining the spring in position, a screw threadedly received in the centerpiece and bearing against the spring, the said screw having on an upper portion thereof an indicating block-like member threadedly attached to the screw and received within a recessed portion of the centerpiece, a washer fitted snugly over a peripheral portion of the said block-like member and mounted in axially slidable non-rotatable relation thereto, the said screw having an axially extending socket therewithin, a filler stud frictionally engaging the block-like member and projecting through said block-like member, the said stud having a shank portion axially slidably and non-rotatably received in the socket of said screw, the said filler stud having a head portion for bearing against the indicating block-like member and overlying the aperture of the block member through which said stud projects, and cap means threadedly engaging the centerpiece and said washer for clamping the said washer against rotation.

3. The combination of a spring for use with a relief valve and an adjuster mechanism for said spring comprising a centerpiece for retaining the spring in position, a screw threadedly received in the centerpiece and bearing against the spring, the said screw having on an upper portion thereof an indicating block-like member threadedly attached to the screw, a washer fitted relative to said block-like member in axially slidable non-rotatable perimetral engagement therewith, the said screw having an axially extending socket therewithin, a filler stud frictionally engaging an upper portion of the block-like member projecting through said block-like member, the said stud having an end depending portion axially slidably and non-rotatably received in the socket of said screw, the said filler stud having a head portion overlying an upper surface of the block-like member, and cap means threadedly engaging the centerpiece and said washer for holding the said washer against rotation and having a chamber for receiving at least a portion of the said block-like member and the filler stud.

4. The combination of a spring for use with a relief valve and an adjuster mechanism for said spring comprising a centerpiece for retaining the spring in position, a screw threadedly received in the centerpiece and bearing against the spring, the said screw having on an upper portion thereof an indicating block-like member threadedly attached to the screw, the said block-like member having notched portions in a plurality of planes, a washer fitted snugly over the outer surfaces of the said block-like member in axially slidable non-rotatable relation thereto, the said screw having an axially extending socket therewithin, a filler stud frictionally gripping an upper portion of said block-like member and having a shank end portion axially slidably and non-rotatably received in the socket of said screw, the said filler stud having a head portion lying in a plane above but bearing against the block-like member, cap means engaging the centerpiece and washer for holding the said washer against rotation, the notched portions of said block-like member indicating relative to an upper surface of the said washer the axial position of said screw.

5. The combination of a spring for use with a relief valve and an adjuster mechanism for said spring comprising a centerpiece for retaining the spring in position, a screw threadedly received in the centerpiece and bearing against the spring, the said screw having on an upper portion thereof an indicator block-like member threadedly attached to the screw, a washer fitted snugly over the said block-like member in axially slidable non-rotatable relation thereto, the said screw at an upper portion thereof having an axially extending splined socket, a filler stud non-rotatably received within an apertured portion of said block-like member and having an end projecting portion axially slidably and non-rotatably received in the socket of said screw, the said filler stud formed with a head portion for bearing against an upper surface of the block-like member to limit the axial movement of the said stud, cap means engaging the centerpiece and washer for holding the said washer against rotation, the said block member having substantially horizontally extending indicia thereon cooperating with an upper surface of the said washer to indicate visually the axial position of said screw and the degree of compression of the said spring.

References Cited in the file of this patent

UNITED STATES PATENTS

| | | |
|---|---|---|
| 304,271 | Lunkenheimer | Aug. 26, 1884 |
| 1,130,050 | Williston | Mar. 2, 1915 |
| 1,162,153 | Gensheimer | Nov. 30, 1915 |
| 2,589,072 | Garretson | Mar. 11, 1952 |
| 2,735,669 | Seiler | Feb. 21, 1956 |

FOREIGN PATENTS

| | | |
|---|---|---|
| 467,235 | France | Mar. 25, 1914 |